March 28, 1961  J. S. ALFORD  2,977,142
SUPPORTING MEANS TO MAINTAIN CONCENTRICITY
BETWEEN TWO MEMBERS
Filed Oct. 18, 1955

$E$ = MODULUS OF ELASTICITY.
$\alpha$ = COEFFICIENT OF THERMAL EXPANSION.
$t_2 - t_1$ = TEMPERATURE DIFFERENCE BETWEEN RING AND RIGID SUPPORT.

MAX. STRESS / $E\alpha(t_2-t_1)$

NUMBER OF EQUAL SPACED RADIAL SUPPORTS

INVENTOR.
JOSEPH S. ALFORD
BY
Edward M. Tittle
HIS ATTORNEY

United States Patent Office 2,977,142
Patented Mar. 28, 1961

2,977,142

SUPPORTING MEANS TO MAINTAIN CONCENTRICITY BETWEEN TWO MEMBERS

Joseph Savage Alford, Cincinnati, Ohio, assignor to General Electric Company, a corporation of New York Filed Oct. 18, 1955, Ser. No. 541,188

5 Claims. (Cl. 287—52)

The present invention relates to a means to maintain concentricity between two members and, more particularly, to a means for maintaining concentricity between two members of different thermal masses and/or coefficients of expansion and is a continuation in part of applicant's co-pending application, Serial No. 446,864, filed July 30, 1954, and now abandoned and assigned to the same assignee as the present application.

In many applications, it is desirable to maintain concentricity of two members for a variety of reasons. However, where two members of substantially different thermal masses and/or coefficients of thermal expansion are involved, various problems arise. If it is desired, for example, to maintain a sleeve concentric with a shaft passing therethrough, the sleeve may be shrunk on the shaft. If the members have substantially different thermal masses and/or coefficients of thermal expansion, and are subjected to large changes in temperature the shrink fit is inadequate to maintain concentricity. The reason for this is that if the sleeve is shrunk upon the shaft too tightly, its elastic limit will be exceeded upon the consequent expansion of the shaft and the sleeve will be permanently stretched to result in looseness. If, however, the sleeve is too loosely shrunk on the shaft, the consequent rapid expansion of the sleeve will also cause looseness and both conditions may result in possible damage depending upon the particular structure involved. Consequently, it is difficult to maintain two members concentric when large differential expansions are caused by either differences in coefficients of thermal expansion, different thermal masses, or a combination of both where large differences in temperature occur. This is true whether the parts be static or rotating since both the thermal masses and/or coefficients of thermal expansion control the differential expansion of the parts during heating or cooling.

It is an object of this invention to provide a support structure between two members by which the members may be maintained concentric with one another regardless of the thermal masses involved and/or the coefficients of thermal expansion of the members.

Briefly stated, in accordance with one aspect of my invention, I maintain an outer member of relatively small thermal mass concentric with an inner shaft-like member of relatively large thermal mass under all conditions of operation. The concentric relation is maintained by supporting the outer member on the inner member by a plurality of peripherally spaced pads between the members which pads are spaced axially of the portion of the outer member which is to remain concentric with the inner member.

The description refers to the accompanying drawings in which.

Figure 1:
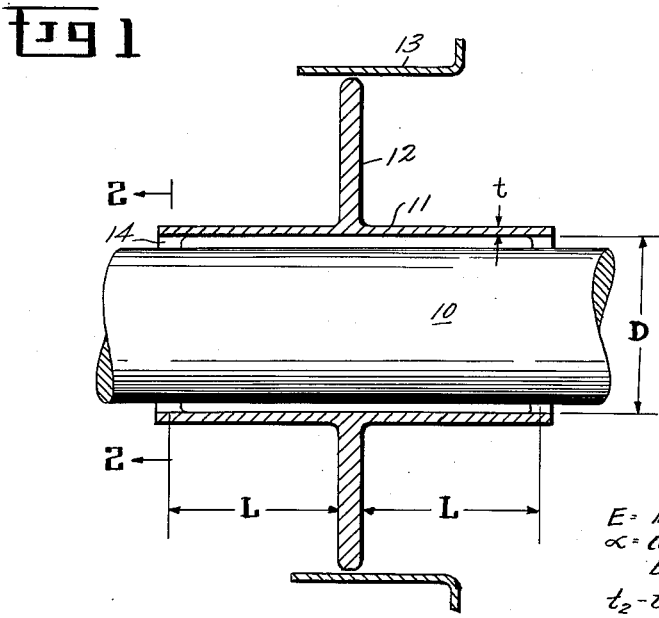
Figure 1 is a partial sectional view of apparatus employing the present invention and is shown somewhat exaggerated.

To illustrate the principle or concept involved in the present invention, the following illustration is given. It is well known that a metallic hoop may be quite flexible, depending upon the material of which it is made. For example, a hoop may be distorted a large amount by applying diametrically opposed and outwardly directed forces on the inner circumferential surface of the hoop to force it into the shape of an ellipse. When the forces are removed, the hoop will return to its circular configuration. However, if the same force was uniformly applied on the inner circumference of the hoop and directed radially outwardly, it can be seen that it would be extremely difficult to stretch the hoop without a large application of force. Such a large application of force could be used to stretch the hoop only a small amount before the elastic limit of the material was exceeded which would then subject the hoop to a permanent stretch. In other words, the peripherally spaced separate application of forces on the inner surface of the hoop can produce large distortion which is not permanent. The continual application of such force around the entire inner periphery of the hoop will produce a small distortion within the elastic limit of the material of the hoop. In some applications, this small distortion is not sufficient for the purpose for which the hoop or its equivalent may be utilized or, a hoop cannot take the required amount of deflection within the elastic limit of the material. This is especially true where the thermal mass of the hoop and the force-applying means are greatly different or where the coefficients of thermal expansion of the two are different. The above explanation is the basic concept used in the structure of the present invention. A further illustration is required for a more complete understanding of the invention. Keeping in mind the above hoop illustration, the following concept should also be observed. If a cylindrical member has peripherally spaced forces applied radially at its end portions, either inwardly or outwardly, it will be apparent that the end portions will be distorted into a polygonal shape, depending upon the number of points of application of the force on the end portions. The distortion of the end portions, depending upon the material, thickness, and length of the cylinder will be communicated in a decreasing amount toward the central portion of the cylinder. In other words, the end portions of a cylinder may be distorted into a polygonal shape and a central portion of the cylinder will remain round. If the above hoop is considered to be at the ends of the cylinder and it is remembered that the hoop can take large distortions without being permanently stretched and still return to its original shape, and that the distortion of the end of a cylinder, depending upon the construction of the cylinder, is not communicated to a portion of the cylinder remote from the distorted end, the principle involved in the present invention will be clear.

A practical application of the above concept may be found in conditions encountered in a turbojet engine. In such an engine, it is desired to provide a seal between rotating and fixed portions of the engine. One part of the seal comprises the fixed portion and the other part of the seal comprises a rotating member that is lightweight or of extremely small thermal mass which is mounted on a rotating shaft of relatively large thermal mass. In such an application, extreme and sudden differential temperature ranges are encountered, consequently the rotating portion of the seal expands much faster than the shaft member which carries it and looseness and vibration resuit if a normal shrink fit is employed to secure the rotating portion of the seal on the shaft. Since the seal is between a fixed and rotating member, it is important that the rotating portion of the seal be maintained concentric with the shaft which supports it under all conditions of operation. The present invention permits this to be accomplished.

It should be pointed out that the concept of the invention and the apparatus claims herein are not limited to the turbojet seal application just given, but may be employed wherever unequal expansion takes place between two members and the concentric relation must be maintained. This condition can occur in either static or rotating parts and the above example is intended to be purely illustrative of a typical application of the invention.

Figure 2:
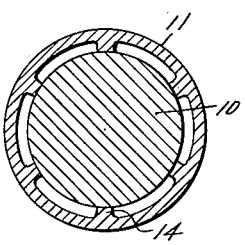
Figure 2 is a cross-sectional view taken on the line 2—2 of Figure 1.

Referring now to the drawings, Figure 1 is an illustrative example of the structure of the present invention. This illustration is typical of the sealing application described in a turbojet engine. A central shaft 10, which in a turbojet engine is a rotating shaft, is surrounded by a sleeve member 11 having a radial fin-like member 12 secured to the central portion of the sleeve 11. Fin 12 may be an integral part of sleeve 11 or may be attached thereto by any suitable means and provides additional mass at the central portion of the sleeve. Member 13 is the fixed member to form the stationary part of the seal. Under all conditions of operation it is desired that fin 12 shall remain concentric with shaft 10 in which the clearance between the fin and member 13 remains uniform over the entire circumference. If the concentricity is maintained this clearance space may be very small and thus the seal may be made more effective. As shown, the thermal mass of sleeve 11 and fin 12 is relatively small in comparison to that of shaft 10. Thus, the two members will expand at substantially different rates. Sleeve 11 is axially elongated, as shown, and is supported for rotation on shaft 10 by a plurality of peripherally spaced members or pads 14 as seen in Figure 2. While the members have been shown as circular in cross section and rotatable, it will be appreciate that the members may be static and non-circular within the concept of the present invention. Pads 14, in rotatable applications, form a driving connection with and in all applications support sleeve 11 in a radially spaced relation on shaft 10. Sleeve 11 may be secured to shaft 10 by shrink fitting pads 14 on shaft 10 or by any other suitable means. The pads may preferably fall in a common transverse plane as shown or depart slightly therefrom and still perform their function.

Figure 3:
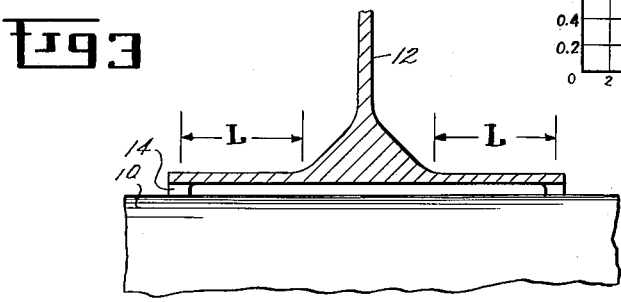
Figure 3 is a partial cross-sectional view of a modified form of Figure 1.

The aforementioned structure illustrates the distorted cylinder effect referred to above. Depending upon the thickness of sleeve 11, the number of peripherally spaced pads 14 and the length L, the expansion of shaft 10 will distort the cylinder ends at pads 14 into a polygonal shape which distortion will be apparent some axial distance along the sleeve. However, the central portion which mounts fin 12, will be undistorted and will remain round thus assuring concentricity of the central portion of sleeve 11 with shaft 10 and consequently a constant clearance between fin 12 and member 13. The length L which I prefer to call the distortion length will vary, depending upon the above mentioned parameters. It may be defined, for purposes of the claims, as the length from the free end at pads 14 over which the distortion can be detected. In other words, the distortion length is the length in which the cylinder transfers from its distorted polygonal end shape at the free end to a true circle. As previously explained, depending upon the parameters of the cylinder, the length L will vary. Figure 3 illustrates a different configuration wherein the length L is shorter due to the larger mass at the base of the fin 12. This length is determined by calculation.

Figure 4:
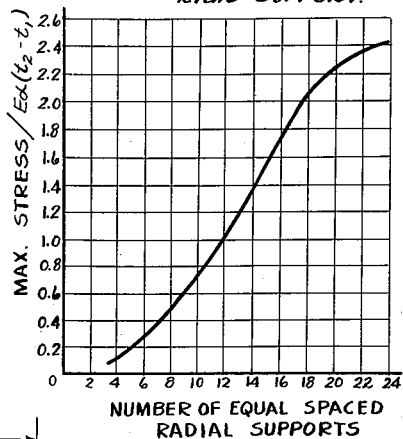
Figure 4 is a graph showing the stress pattern of structure of the present invention utilizing spaced support pads in comparison to the stress pattern for a solid shrink fit.

Referring next to Figure 2, it can be seen that six pads 14 are equi-spaced peripherally around the inner diameter of sleeve 11. Practical reasons normally would require the pads 14 be equi-spaced merely in compliance with good design procedure. However, within the concept of the present invention, the pads 14 need not be equi-spaced so long as they are peripherally spaced around shaft 10. Also, the pads need only be made large enough to carry compressive loads within the acceptable compressive stress. It can further be seen that as the number of pads 14 is increased, the structure approaches that of a continuous shrink fit. As previously stated, high stresses are encountered in such a structure. This is shown in Figure 4 wherein the number of equi-spaced radial supports is plotted as the abcissa and stress ratio is plotted as the ordinate. In the ordinate stress ratio, the numerator is the stress in a ring having a radial thickness of one tenth inch, an inside diameter of twenty inches, and using a finite number of peripherally spaced pads. In other words, a typical ring is selected. The denominator is the stress of a continuous ring which has contact over the full inner circumference of the shaft when the shaft is expanded. That is, the denominator represents a standard case of shrink fit of a similar ring upon a shaft. It can be seen from Figure 4 that the stress ratio increases as the number of spaced radial supports increases so that at 1.0 on the ordinate there is no advantage in using spaced supports rather than a continuous ring. It is apparent that the stress ratio is considerably lower below 1.0 and reaches a minimum when three peripheral supports are used. Of course, it is impractical to go below three supports since the device would then be unstable.

Applicant has discovered that certain relations may be employed to obtain the best results with the invented structure. For example, if the $L/D$ ratio is kept between 0.05 to 0.25 where L is the aforementioned distortion length and D is the inner diameter of the sleeve member, then excellent results are obtained. In addition, it may be desirable for good results to keep $t$ between one-fourth of one percent to one percent of D, where $t$ is the thickness of sleeve 11 substantially at the free end of the distortion length L as seen in Fig. 1, and D is the aforementioned inner diameter. Referring to Figure 4, it can be seen that the number of supports preferably may be maintained between 3 and 8. If these relations are employed, the resulting structure provides for the most efficient arrangement within the economic use of material and weight limitations. For instance, if the length L is too short, excessive shear and flexural stresses are produced in sleeve member 11. On the other hand, if the sleeve 11 is too long, undesirable lateral flexibility creates a vibration problem in movable parts. The above relations will avoid these effects if they are critical in the particular installation.

While I have shown the sleeve member extending on both sides of fin 12, it will be apparent that it need not do so. That is, a single distortion length L may be employed as represented by either side of Figure 1. This may require additional axial support if axial trueness is to be maintained. Without the additional support of sleeves 11 on both sides of fin 12, forces may tend to throw fin 12 out of alignment and reduce the effectiveness of the seal. The primary requirement in utilizing the invention is that the sleeve 11 should be supported by peripherally spaced pads 14 at one end which may be termed the free end, and the concentric member, such as fin 12 or central portion of sleeve 11, must be radially spaced and free of support of the shaft 10 or its equivalent at the other end of the distortion length which extends inwardly from the free end to the circular part of the cylinder, depending upon the above parameters as previously explained. Obviously, shaft 10, or its equivalent, must extend beyond at least one end of sleeve 11 and, for rotational applications, preferably beyond both ends of sleeve 11.

While particular embodiments of the invention have been illustrated and described, it will be obvious to those skilled in the art that various changes and modifications may be made without departing from the invention and it is intended to cover in the appended claims all such changes and modifications that come within the true spirit and scope of the invention.

What I claim as new and desire to secure by Letters Patent is:

1. A support structure to maintain concentricity during differential expansion between two members of different thermal masses comprising: a first member; a second member concentric with the first member; a sleeve surrounding and spaced from the first member, said sleeve being secured to the second member and extending laterally therefrom; peripherally spaced pads formed on the inner surface of the sleeve at points laterally removed from the second member, said pads being shrink fitted to the first member to secure the sleeve to the first member and form a driving connection therebetween, the portions of the sleeve wall between the pads being sufficiently thin relative to the sleeve inner diameter to distort under the stress of differential expansion between the sleeve and the first member, and the length of the sleeve between the pads and the second member being sufficiently long that the portion of the sleeve adjacent the secondary member remains undistorted.

2. Apparatus as described in claim 1 wherein said peripherally spaced pads comprise not less than three nor more than eight.

3. Apparatus as described in claim 2 wherein said sleeve is circular in cross-section and has a finite inner diameter and said sleeve has a distortion length to diameter ratio of not less than 0.05 and not greater than 0.25.

4. Apparatus as described in claim 2 wherein the average thickness of said sleeve throughout its distortion length is not less than one-fourth of one percent nor more than one percent of the sleeve inner diameter.

5. Apparatus as described in claim 1 wherein the average thickness of said sleeve throughout its distortion length is not less than one-half of one percent nor greater than two percent of the sleeve diameter and said peripherally spaced pads are equi-spaced and comprise not less than three nor more than eight.

References Cited in the file of this patent

UNITED STATES PATENTS

| | | |
|---|---|---|
| 1,825,239 | Meyer | Sept. 29, 1931 |
| 1,873,956 | Dahlstrand | Aug. 30, 1932 |

FOREIGN PATENTS

| | | |
|---|---|---|
| 219,655 | Great Britain | Oct. 9, 1924 |
| 613,632 | France | Nov. 25, 1926 |
| 123,195 | Switzerland | Nov. 1, 1927 |
| 236,207 | Great Britain | Apr. 8, 1926 |